United States Patent
Lu et al.

(10) Patent No.: US 7,983,480 B2
(45) Date of Patent: Jul. 19, 2011

(54) TWO-LEVEL SCANNING FOR MEMORY SAVING IN IMAGE DETECTION SYSTEMS

(75) Inventors: Juwei Lu, Toronto (CA); Hui Zhou, Toronto (CA); Mohanaraj Thiyagarajah, Scarborough (CA)

(73) Assignee: Seiko Epson Corporation, Tokyo (JP)

( * ) Notice: Subject to any disclaimer, the term of this patent is extended or adjusted under 35 U.S.C. 154(b) by 1097 days.

(21) Appl. No.: 11/750,099

(22) Filed: May 17, 2007

(65) Prior Publication Data

US 2008/0285849 A1    Nov. 20, 2008

(51) Int. Cl.
*G06K 9/36* (2006.01)
(52) U.S. Cl. ........ 382/166; 382/162; 382/167; 382/190; 382/173; 433/29; 433/30; 356/497
(58) Field of Classification Search ................... 382/162, 382/164, 165, 166, 167, 168, 118, 103, 291, 382/190, 274; 348/453, 496, 498; 345/589, 345/597, 604, 605
See application file for complete search history.

(56) References Cited

U.S. PATENT DOCUMENTS

| | | | |
|---|---|---|---|
| 7,020,337 B2 | 3/2006 | Viola et al. | |
| 7,257,271 B2 * | 8/2007 | Adams et al. | 382/275 |
| 7,835,549 B2 * | 11/2010 | Kitamura et al. | 382/118 |
| 2002/0081003 A1 | 6/2002 | Sobol | |
| 2002/0102024 A1 | 8/2002 | Jones et al. | |
| 2002/0150280 A1 * | 10/2002 | Li | 382/117 |
| 2004/0017938 A1 * | 1/2004 | Cooper et al. | 382/171 |
| 2005/0180627 A1 | 8/2005 | Yang et al. | |
| 2006/0029265 A1 | 2/2006 | Kim et al. | |
| 2006/0034517 A1 | 2/2006 | Bober et al. | |
| 2006/0062451 A1 * | 3/2006 | Li et al. | 382/159 |
| 2006/0120572 A1 * | 6/2006 | Li et al. | 382/118 |
| 2006/0126938 A1 | 6/2006 | Lee et al. | |

* cited by examiner

*Primary Examiner* — Samir A Ahmed
*Assistant Examiner* — Ali Bayat
(74) *Attorney, Agent, or Firm* — Mark P. Watson

(57) ABSTRACT

A method and system for scanning a digital image for detecting the representation of an object, such as a face, and for reducing memory requirements of the computer system performing the image scan. One example method includes identifying an original image and downsamples the original image in an x-dimension and in a y-dimension to obtain a downsampled image that requires less storage space than the original digital image. A first scan is performed of the downsampled image to detect the representation of an object within the downsampled image. Then, the original digital image is divided into at least two image blocks, where each image block contains a portion of the original digital image. A second scan is then performed of each of the image blocks to detect the representation of the object within the image blocks.

16 Claims, 9 Drawing Sheets

TWO-LEVEL SCANNING FOR MEMORY SAVING IN IMAGE DETECTION SYSTEMS

BACKGROUND

1. The Field of the Invention

Embodiments of the present invention relate to image processing. More specifically, disclosed embodiments relate to methods and systems for detecting the representation of objects, such as a human face, within a digital image.

2. The Relevant Technology

Computer technology is increasingly used for detecting objects in digital images. For example, some computer systems are configured to examine a photographic digital image and then detect the size and location of any human face within the image. At least one goal of face detection systems is to accurately detect facial features in a digital image and distinguish the facial features from other objects in the digital image. Patterns in a digital image that correspond with a face vary extensively and are highly complex, due to the variations in facial appearance, lighting, expressions, and other factors. As a result, face detection systems are quite complex.

A common challenge encountered when implementing object detection systems is the large amount of memory that is required in order to scan a digital image. For example, for a quarter video graphics array ("QVGA") sized input image with 320×240 resolution, a typical face detection scheme can require at least 1.5 MB of memory. As the size of the input image increases, so does the memory requirement. As will be appreciated, the process of scanning images often requires more memory than is available in many devices, such as printers, scanners, and standard computers. Scanning large images can quickly drain the memory resources of many modern computers, thus disrupting the computer's ability to perform other necessary functions.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In general, example embodiments are concerned with systems and methods for providing an image detection system that is both accurate and computationally efficient. While disclosed embodiments are described as having particular applicability as a detection system and method for detecting facial images, it will be appreciated that many of the concepts would have equal applicability in the detection of other image objects as well. One potential advantage of disclosed embodiments includes a reduced memory requirement, which is accomplished with a minimal impact on detection rates, false detection rates, and computational efficiency.

One example embodiment of the present invention is directed to a method of scanning a digital image for detecting the representation of an object. The example method may be practiced, for example, in a computer system that includes an image processor and a memory to store image data.

In disclosed embodiments, the method includes downsampling an original image in multiple dimensions, such as in an x-dimension and in a y-dimension, to obtain a downsampled image that requires less storage space than the original digital image. For example, an original digital image might be downsampled by a factor of two in an x-dimension and a factor of two in a y-dimension to obtain a downsampled image that requires at least approximately one-fourth less storage space than the original digital image.

A first scan is then performed of the downsampled image to detect the representation of a desired object, such as a facial image, within the downsampled image. Then, the original digital image is divided into at least two image blocks, where each image block contains at least a portion of the original digital image. A second scan is then performed of each of the image blocks to detect the representation of the desired object within the image blocks.

Utilizing the above scan process eliminates the need to ever scan in a full version of the image, thereby reducing storage requirements and increasing computational efficiency.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

In the following detailed description of various embodiments of the invention, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

In the following description, an example embodiment of a method and apparatus for object detection, such as a human face, in a digital image is provided. The illustrated example uses a two-level scanning scheme. During a first level scan step, the digital image is downsampled to a smaller storage requirement size, and the downsampled image is then scanned to detect the presence of predefined objects, such as facial images, within the downsampled image. During a second level scan step, the original digital image is divided into multiple image blocks, each containing a portion of the original digital image. Then, each of the image blocks are scanned to detect the presence of the predefined objects within the image blocks. Because the entire original image is never scanned in a single scan, the memory size that is required to scan the image is significantly reduced.

Figure 1:
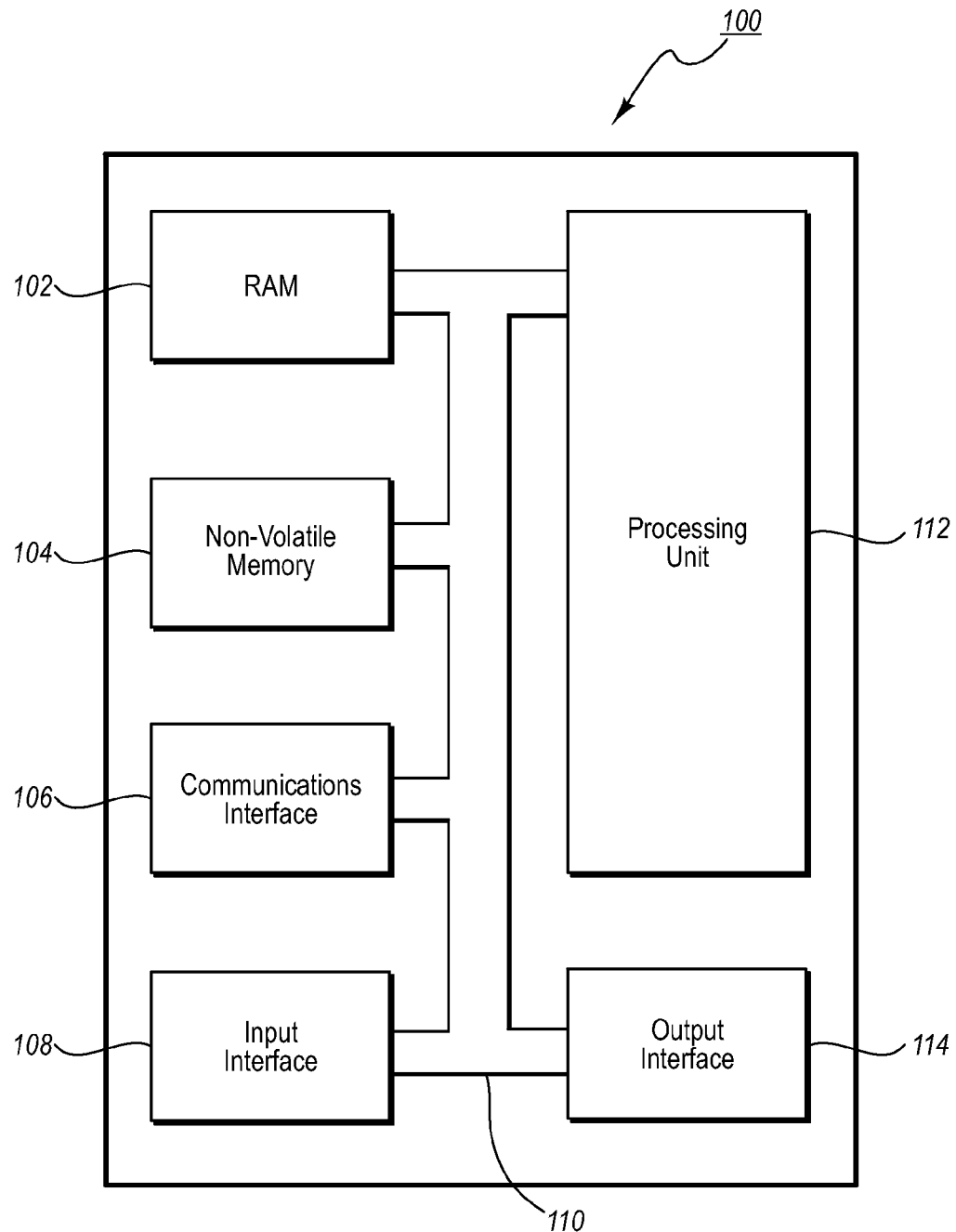
FIG. 1 illustrates a schematic diagram of one example of a computer system that may be employed for face detection.

FIG. 1 shows one example of a computer system 100 for image detection. The computer system 100 can be implemented as a personal computer, or similar type of programmable workstation, that can programmably execute image detection software to enable it to process images and detect faces (or other image objects) therein. In the illustrated example, the computer system 100 comprises a processing unit 112, random access memory ("RAM") 102, non-volatile memory 104, a communications interface 106, an input interface 108 and an output interface 114, all in communication over a local bus 110. The processing unit 112 loads and executes software, stored in non-volatile memory 104, for image detection. The processing unit 112 registers any ongoing calculations during image detection in RAM 102. The computer system 100 may be coupled to a network or server for storing images and results centrally via the communications interface 106. The input interface 108 may include a keypad and a mouse for interacting with the software for image detection, such as for modifying various settings/thresholds. The input interface 108 can also include a scanner (or similar image capture device) for capturing images to be analyzed for image detection. In this example, the output interface 114 includes an electronic display that can visually present results of the image detection, if so desired, and can, for example, display settings of the software to allow for their adjustment.

Figure 2:
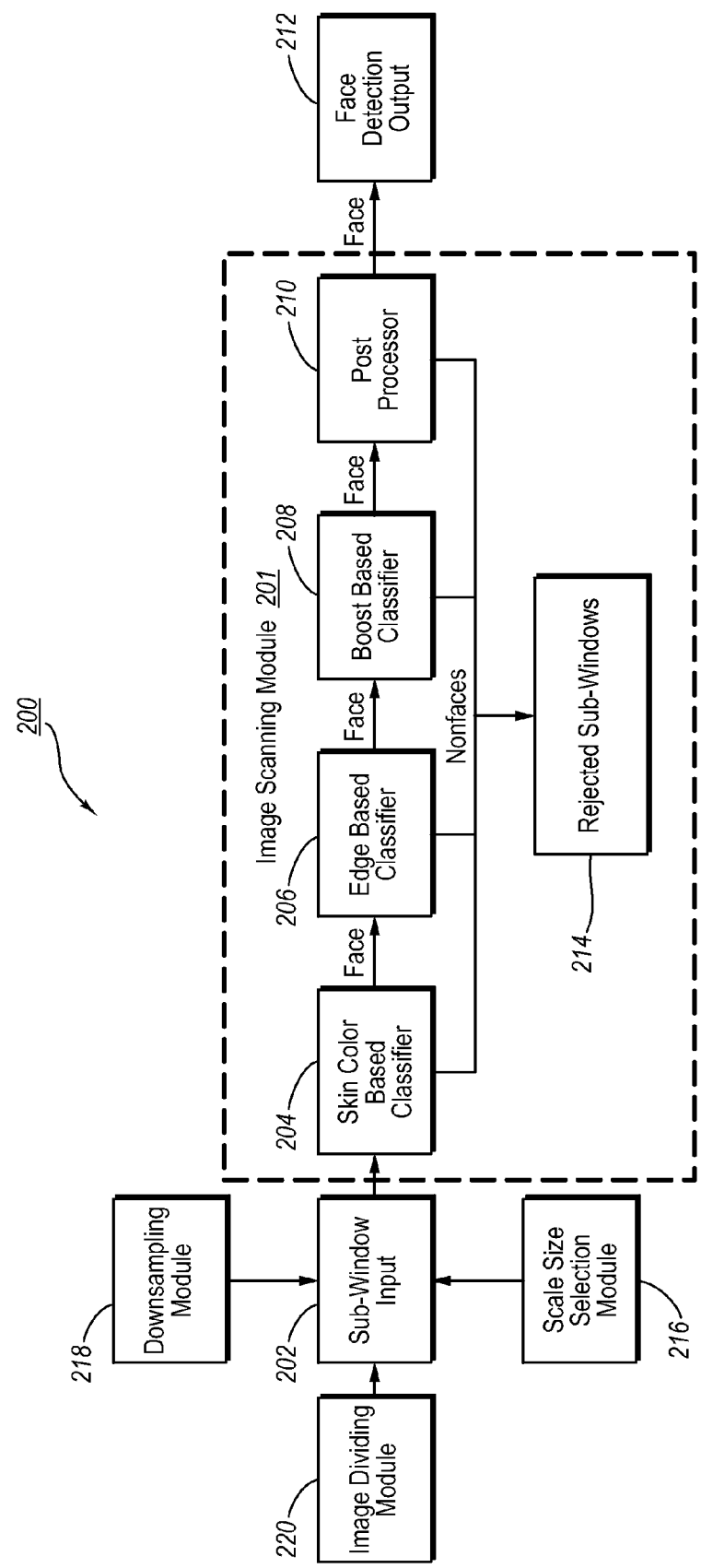
FIG. 2 illustrates a schematic diagram of one example of a face detection system, in accordance with the present invention.

Referring now to FIG. 2, a more detailed example is illustrated using a diagrammed reference to an example embodiment of an image detection system, denoted generally at 200. The example image detection system 200 is configured to detect the representation of faces within an image. However, it will be appreciated that this particular application is for purposes of illustration only, and that the image detection system might also be implemented to detect other, non-facial objects within an image as well.

The illustrated detection system 200 includes a downsampling module 218, an image dividing module 220, a scale size selection module 216, a sub-window input 202, an image scanning module 201, and a face detection output 212. In the illustrated embodiment, the image can be broken down into one or more sub-windows. Each sub-window may be received by the image scanning module 201 from the sub-window input 202.

Although any number of scanning techniques may be employed during the multi-level scanning schemes described herein, the illustrated image scanning module 201 utilizes a number of classifiers for eliminating sub-windows that have a low likelihood of representing a face. Namely, the illustrated image scanning module 201 utilizes a skin-color based classifier 204, an edge based classifier 206, and a boost based classifier 208 for detecting the representation of faces within an image. Upon receiving a sub-window from the sub-window input 202, the skin color based classifier 204, the edge based classifier 206, and the boost based classifier 208 eliminate sub-windows that have a low likelihood of representing a face. The eliminated sub-windows are represented by the rejected sub-windows bin 214.

In the illustrated embodiment, the output of the classifiers 204, 206 and 208 is processed by the post processor 210. The post processor 210 generates an output for identifying the representation of faces that exist within the digital image being scanned, and may eliminate additional sub-windows that are deemed to be non-face sub-windows. The post-processing component may perform a variety of operations, such as merging of multiple detects for eliminating sub-windows with a low confidence, mirroring the face detector for fast verification, removal of overlapped positive candidates, removal of minimal and maximal positive candidates having a high chances of being false positives, and removal of unusual neighboring positive candidates.

As described previously, the example face detection system 200 can be implemented to perform multiple levels of scanning on a digital image in order to detect the representation of faces within the image in a more computationally efficient manner. An example digital image, denoted generally at 300, is provided by way of illustration in FIG. 3A. During the first scanning level, the downsampling module 218 downsamples the original digital image 300 in an x-dimension 302 and in a y-dimension 304. An example downsampled image, denoted generally at 320, is provided by way of illustration in FIG. 3B. Although the downsampling module 218 may downsample the original image and 300 by any factor in the x-dimension 302 and in the y-dimension 304, the illustrated downsampled image 320 has been downsampled by a factor of two in the x-dimension and by a factor of two in the y-dimension. Therefore, the resultant downsampled image 320 requires only approximately one-fourth the storage space in comparison with the original image 300.

After forming the downsampled image 320, the image scanning module 201 scans the downsampled image to detect the representation of faces 322 and 326 within the downsampled image. As mentioned previously, while any number of scanning techniques may be employed to scan the downsampled image 320, the illustrated embodiment scans the downsampled image using a series of classifiers 204, 206 and 208, and the post-processor 210. Any detected faces are sent to the face detection output 212.

During the second scanning level the image dividing module 220 divides the original digital image into at least two image blocks, each image block containing a portion of the original digital image. An example digital image 340, divided into four digital image blocks 342, 344, 346 and 348, is provided by way of illustration in FIG. 3C. As depicted in FIG. 3C, each of the image blocks 342, 344, 346 and 348 contains a portion of the original image 300. Each of the image blocks 342, 344, 346 and 348 is scanned individually by using, for example, the image scanning module 201 during a second scan in order to detect the representation of one or more faces 350 and 354 in the four image blocks. Upon detecting the faces 350 and 354, the post processor 210 sends the detected faces to the face detection output 212.

Therefore, in the illustrated embodiment, at any given time the image scanning module 201 is only scanning images that require, at most, approximately one-fourth of the storage space as compared to the original image 300. Consequently, the amount of memory required by the example system 200 to perform face detection is significantly reduced. By scanning the downsampled image 320, the image scanning module 201 is likely to find larger faces and faces that overlap the intersecting regions of the four image blocks 342, 344, 346 and 348. Then, by scanning each of the image blocks 342, 344, 346 and 348, smaller faces, such as the face 354 can be found.

As illustrated in the divided image 340, in one embodiment, the image dividing module 220 simply divides the original image 300 into four or more equally sized image box 342, 344, 346 and 348, without any overlapping regions between the image blocks. This illustrated embodiment provides the advantage of maximum memory preservation because the size of each of the box 342, 344, 346 and 348 is kept to a minimum.

Figure 3A:
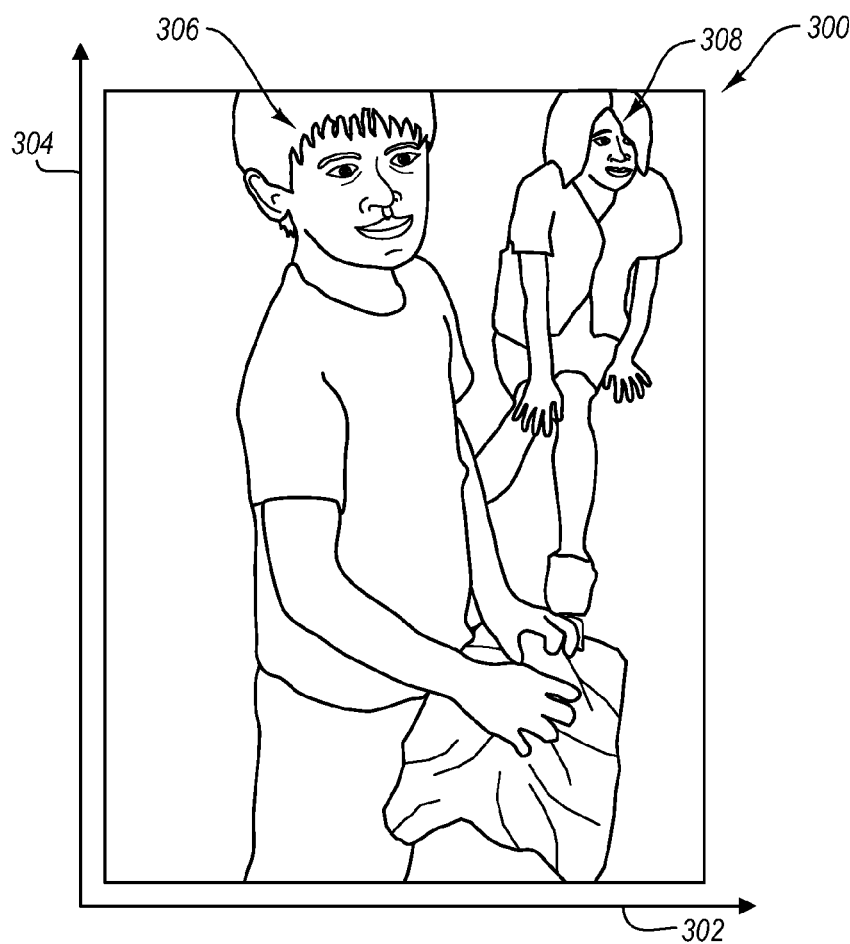
FIG. 3A illustrates an image used for providing an example of two-level scanning, in accordance with the present invention.
Figure 3B:
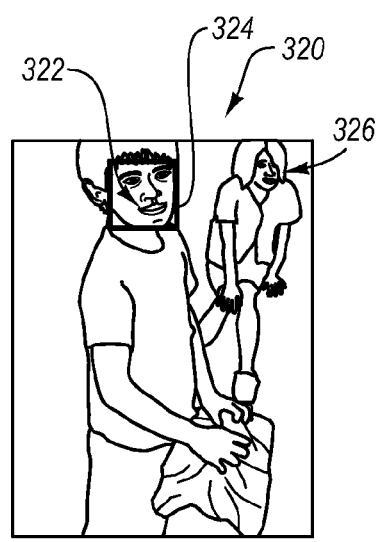
FIG. 3B illustrates the image of FIG. 3A after being downsampled in the x and y dimensions to be scanned during a first scanning level.
Figure 3C:
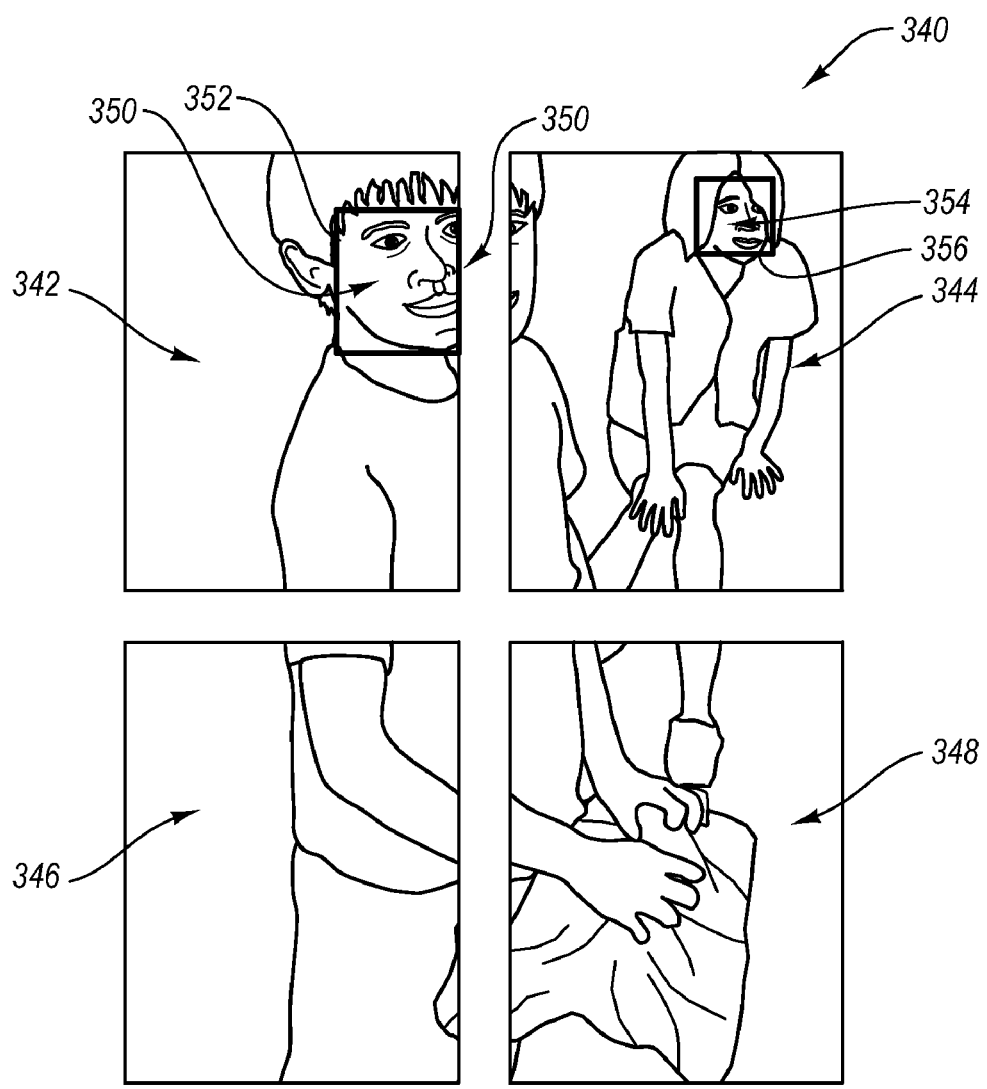
FIG. 3C illustrates the image of FIG. 3A after being divided into four image blocks to be scanned during a second scanning level.
Figure 3D:
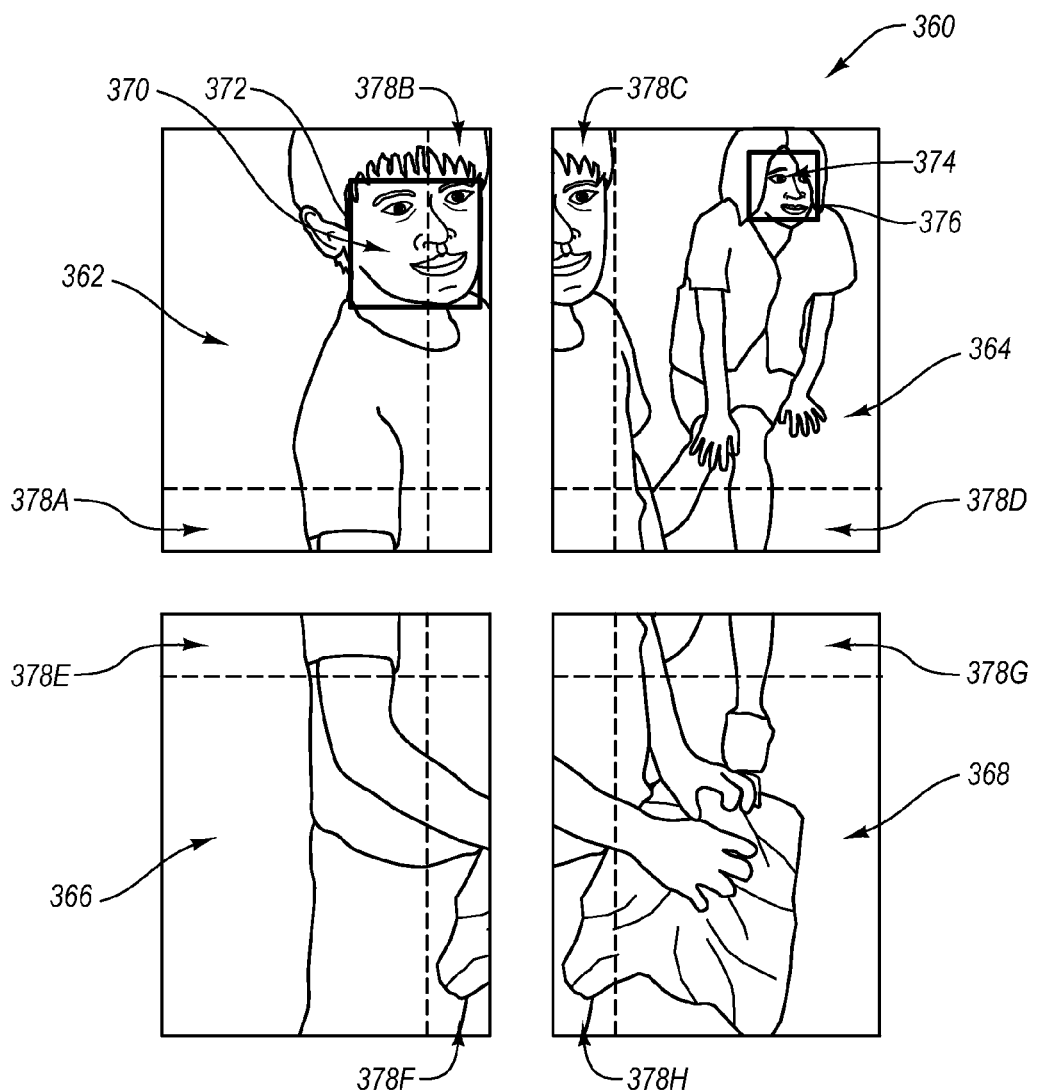
FIG. 3D illustrates the image of FIG. 3A after being divided into four image blocks having overlapping portions to be scanned during the second scanning level.

However, in another example embodiment, illustrated in FIG. 3D, the image dividing module 220 divides the original digital image 300 such that four resultant image blocks 362, 364, 366 and 368 contain overlapping portions 378A-378H of at least one of the other image blocks. Although the overlapping regions 378A-378H may require slightly more memory, the overlapping regions assist in the detection of faces appearing in the intersecting regions between the four image blocks 342, 344, 346 and 348 of FIG. 3C. For example, the face 350 in FIG. 3C is currently divided between the image block of 342 and the image block 344. Therefore, it may be difficult for the image scanning module 201 to detect the face 350. However, by creating the overlapping regions 378A-378H illustrated in FIG. 3D, the image block 362 contains the entire face 370, thereby increasing the detection rate of the face 370 by the image scanning module 201. In the illustrated embodiment, the starting scanning points during the scanning of the image blocks 362, 364, 366 and 368 may be determined such that the overlapping regions 378A-378H between neighboring blocks do not need to be scanned multiple times, so as to further preserve processing and memory requirements.

As used herein, a face's "size" is measured in relation to the original image 300, as opposed to the downsampled image 320 where the image is one fourth its original size. The image scanning module 201 may be configured to scan for larger-sized faces, in relation to the original image 320, during the first scan of the downsampled image 302, and search for smaller sized faces during the second scanning level of the divided images 340 or 360. In particular, the image scanning module 201 may have a limitation on the minimum face size that it is capable of detecting. Therefore, by way of example, during the first scanning level of the downsampled image 302, the image scanning module 201 may be configured to search for faces that have the size, in relation to the racial image 300, that is twice the size in both dimensions 302 and 304 as the minimum face size that it is capable of detecting. Then, during the second scanning level of the divided image 340 or 360, the image scanning module 201 may be configured to search for faces down to the minimum face size that it is capable of detecting.

As described previously, the image scanning module 201 may scan each image as a series of sub-windows, where the size of each sub-window is defined by a scale size, as determined by a scale size selection module. Each sub-window may be analyzed multiple times at different scale sizes in order to accurately detect faces of all different sizes. Therefore, the scale size selection module 216 may be tasked with fixing a minimum scale size used during the first scanning level that is larger, in relation to the original image 300, than a minimum scale size used during the second scanning level so that the scanning of the downsampled image 320 will detect objects that are larger than the objects detected in the second scan, as described above. Furthermore, the scale size selection module 216 may select the scale sizes used during the first and second scanning levels such that the range of skills sizes used during the first scanning level overlaps with the range of skills sizes used turned the second scanning level in order to ensure that faces of all sizes will be found between the first and second scanning levels.

In the illustrated embodiment, the image scanning module 201 may be configured to save processing power and time during the second scanning level by skipping over regions that were previously detected as faces during the first scanning level. For example, and referring again to FIGS. 3B and 3D, assuming that the face 322 was detected within the sub-window 324 during the scanning of the downsampled image 320, the sub-window 372 of the image block 362, which maps to the sub-window 324 of the downsampled image 320 may be bypassed during the scan of the image block 362. Therefore, further processing power and memory resources may be conserved, in accordance with the present embodiment.

In addition to conserving memory, the scanning strategies illustrated herein only slightly affect the overall accuracy of face detection accuracy. In the results of one experiment, the proposed scanning technique using the overlapping regions 378A-378H of FIG. 3D only degrade the detect rate by approximately 1% to 2%. Furthermore, the speed at which the face detection operates is also only slightly affected, if at all. A small number of extra computations are needed to build the downsampled image and to process the overlapping regions 378A-378H. However, these extra computations are often offset by bypassing regions during the second scanning level that have been identified as faces with high confidence during the first scanning level 1. As a result, the overall system performance is only affected slightly, if at all.

As mentioned previously, the illustrated image scanning module 201 includes a skin color based classifier 204, an edge based classifier 206, a boost based classifier 208, and a post processor 210. In the example embodiment, if at any stage of the analysis, one of the classifiers 204, 206, or 208 indicates that a sub-window does not represent a face, the analysis of the sub-window may be terminated. If none of the classifiers 204, 206 or 208 reject the sub-window as being a non-face image, then the sub-window is deemed to represent a face. Thus, if the sub-window fails the tests at any one stage, further processing resources and time are not wasted by further analyzing the sub-window.

In the illustrated embodiment, the skin color based classifier 204 analyzes the sub-windows and eliminates the sub-windows having a low likelihood of representing a face image based on the colors of the sub-windows. For example, in one embodiment, the skin color based classifier 204 generates a skin-color component, '$F_s$'. If $F_s$ falls below a predetermined level, then the sub-window is classified as a non-face and is rejected. In one embodiment, given a sub-window, S(x, y, s, s|I), the skin based classifier 204 calculates $F_s(S)>0$ if S is identified by Fs as a face, and $F_s(S)<0$ otherwise, in which case the sub-window is rejected.

The edge based classifier 206 may analyze the sub-windows and eliminate additional sub-windows that have a low likelihood of representing a face based on an edge magnitude of the digital image within the sub-windows. For example, in one embodiment, the edge based classifier 206 generates an edge component '$F_e$'. If $F_e$ falls below a predetermined level, then the sub-window is classified as a non-face and is rejected. In one embodiment, given a sub-window, S(x, y, s, s|I), the edge based classifier 206 calculates $F_e(S)>0$ if S is identified by $F_e$ as a face, and $F_e(S)<0$ otherwise, in which case the sub-window is rejected.

Figure 4:
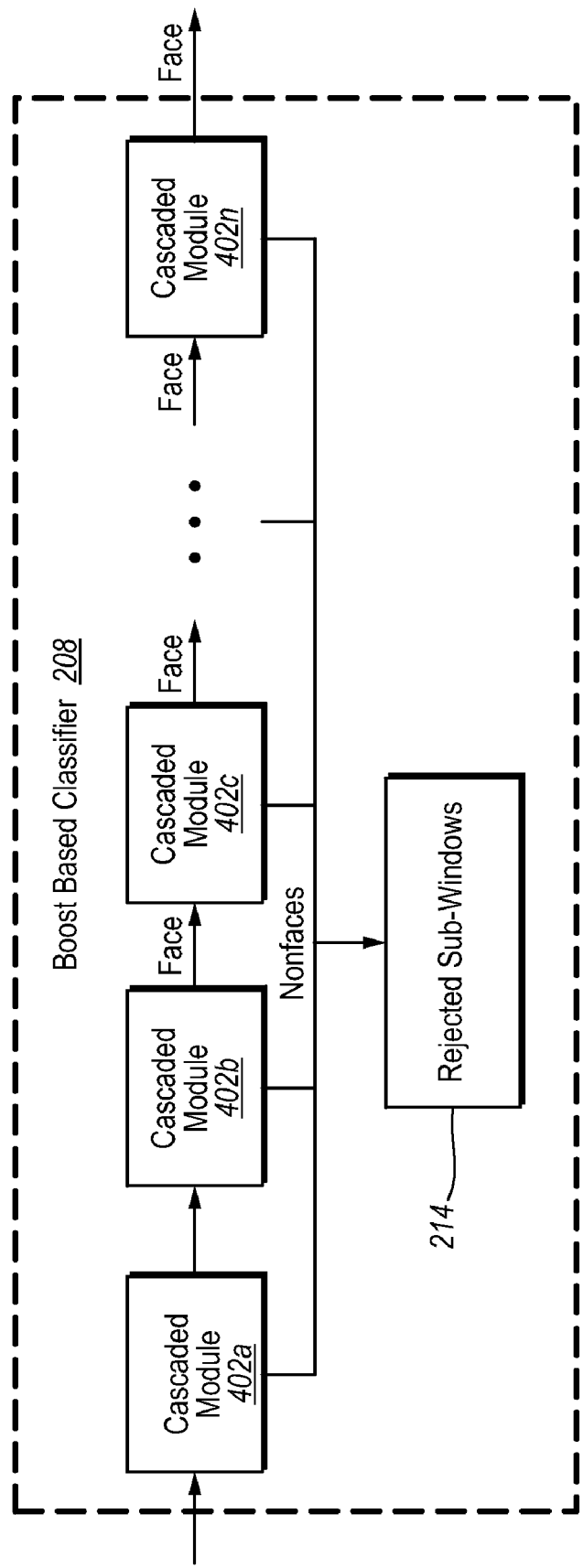
FIG. 4 illustrates a schematic diagram of one example of a boost based classifier, in accordance with the present invention.

The boost classifier 208 analyzes the sub-windows and eliminates additional sub-windows that have a low likelihood of representing a face image. In one embodiment, the boost classifier 208 may employ an AdaBoost-like technique. As is illustrated in the example of FIG. 4, the boost classifier, denoted generally at 208, may include a plurality of cascaded modules 402a-402n. Each sub-window analyzed by the boost based classifier 208 must pass through at least a portion of the cascaded modules 402a-402n before it will be detected as representing a face.

In one embodiment, each subsequent cascaded module 402 has a lower false-detect tolerance level than the previous cascaded module. In other words, sub-windows that do not represent a face are more likely to be allowed (or passed through) by cascaded modules having high false-detect tolerance levels. By way of example, a sub-window that may successfully pass through the cascaded module 402a due to a high false-detect tolerance level may be eliminated by the subsequent cascaded module 402b, due to its lower false-detect tolerance level.

As described previously, the skin color based classifier 204 is designed to reject many of the non-face sub-windows, and significantly reduce the burden of the subsequent classifiers 206 and 208. A description of example embodiments for implementing the skin color based classifier 204 will now be provided.

In one embodiment, a pre-trained skin-color model may be employed by the classifier to transform the input color image, 'I', to a skin-color map, where each pixel can be identified to be skin or non-skin color. In order to identify each pixel as skin or non-skin, the RGB values of each pixel (z=[r,g,b]) may be fed into a binary Bayesian classifier. The binary Bayesian classifier may determine a probability that each pixel represents skin or non-skin based on the RGB color value of the pixel. A set of sub-windows, such as a pre-trained skin-color model, may be used to train the system. During the training, each sub-window of each training digital image may be classified as representing a face or non-face, and the pixels of the sub-windows may be used to generate skin and non-skin histograms respectively. The histograms may include three-dimensional arrays, with each dimension corresponding to one of the R, G and B values in the RGB color space.

In one embodiment, the histograms are 32×32×32 in dimension. As training images are manually identified as representing or not representing a face, the appropriate face or non-face histogram is populated with the pixel values from the images. These histograms are then used to compute the Bayesian probability of pixel color values resulting from skin and non-skin subjects. That is, $$P(z|skin) = \frac{H_s(z)}{N_s}$$

is the probability that a particular color value, z, results from a given skin subject, where $H_s(z)$ is the skin histogram, and $N_s$ is the skin histogram built from the training set having the same RGB values as the pixel being analyzed, and where $N_s$ is the total number of pixels contained in the skin histogram. Correspondingly, $$P(z|nonskin) = \frac{H_n(z)}{N_n}$$

is the probability that a particular color value, z, results from a given non-skin subject, where $H_n(z)$ is the non-skin histogram built from the training set having the same RGB values as the pixel being analyzed, and where $N_n$ is the total number of pixels contained in the non-skin histogram.

Using these two probabilities, the Bayesian classifier for each pixel is determined to be $$g(z) = \begin{cases} 1, & \text{if } \frac{p(z|skin)}{p(z|nonskin)} \geq \theta_g \\ 0, & \text{otherwise} \end{cases},$$

where $\theta_g$ is a threshold that can be used to adjust the trade-off between correct detect rates and false positives. A binary skin/non-skin color map is thus generated for each sample region, with pixels deemed to represent skin being assigned a value of 1 and pixels deemed to represent non-skin being assigned a value of 0.

Figure 5:
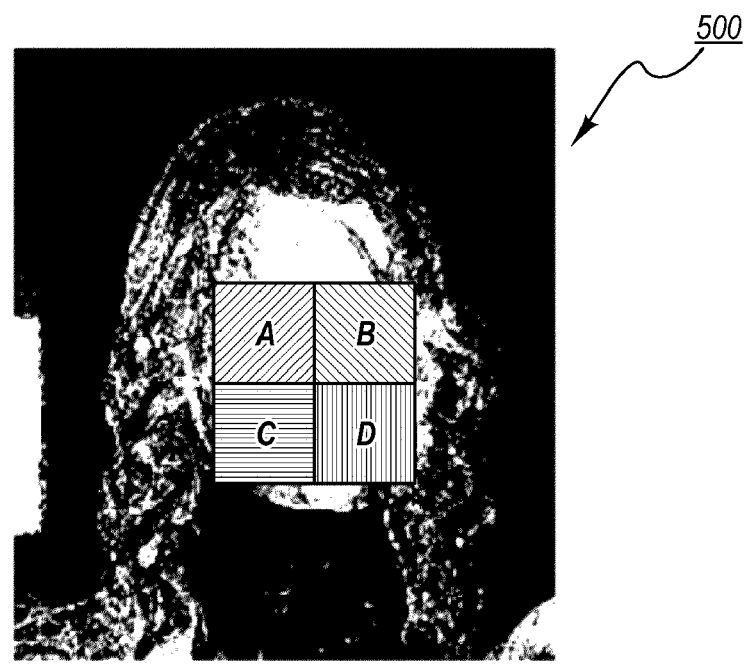
FIG. 5 illustrates four basic feature units applied on a skin-color map of an image.

In one embodiment, in order to reject the non-face sub-windows, the skin color based classifier 204 may divide each sub-window into at least two frames and apply the sub-window to a skin-color map. Various sum-based scalar features may be calculated by determining the sum of one or more combinations of the frames. A sub-window can then be rejected if one or more of the calculated sums fall below a predetermined level. For example, and in one embodiment, given the skin color map 'g(x)' of a sub-window x(x, y, s), seven sum-based scalar features may be extracted from the color map for color face detection. The skin color map g(x) may be divided into four rectangular frames for the purpose of generating the seven sum-based scalar features. FIG. 5 illustrates an example sub-window divided into four rectangular frames, A, B, C, and D, as applied to a skin-color map 500.

The seven sum-based scalar features may be determined by summing the four rectangles in different combinations, as follows:

$f_1$=sum(A)+sum(B)+sum(C)+sum(D)

$f_2$=sum(A)+sum(C)

$f_3$=sum(B)+sum(D)

$f_4$=|sum(A)+sum(C)−sum(B)−sum(D)|

$f_5$=sum(A)+sum(B)

$f_6$=sum(C)+sum(D)

$f_7$=|sum(A)+sum(B)−sum(C)−sum(D)| where sum(X) denotes the pixel sum of the pixel values g(x) in a sample region Z. All the features can be efficiently calculated by using a summed-area table or integral image of the skin-color probability map at any image scale. These scalar features are used to classify the sub-window x(x, y, s) by comparing them to the predetermined value, or threshold set, for each of the seven scalar features. That is, $$f_i(x) \begin{cases} \geq \theta_i \Rightarrow facepattern \\ < \theta_i \Rightarrow nonfacepattern \end{cases}$$

where $\theta_i$ is a threshold that can be determined by evaluating results of this color feature using training data. The seven scalar features may be calculated and compared to the respective thresholds in a cascaded manner from $f_1$ to $f_7$. If any one of the scalar features for a sub-window fails to meet the respective threshold, the skin color based classifier 204 deems the sub-window to represent a non-face and the determination of the remainder of the seven scalar features and other classifiers is aborted.

As described previously, if the sub-window is deemed to not represent a face using the skin-color-based classifier 204, then the operation may be aborted prior to reaching the edge-based classifier 206. A description of example embodiments for implementing the edge based classifier 206 will now be provided.

In one embodiment, the edge-based classifier 206 analyzes the sub-window by generating an edge map of the input image, I, using the edge magnitude of the image. In one embodiment, the edge magnitude is computed using the first-order derivative:

$$s(I) = \sqrt{\left(\frac{\delta I}{\delta x}\right)^2 + \left(\frac{\delta I}{\delta y}\right)^2}$$

In the illustrated embodiment, a Soebel edge detection technique may be employed. The Soebel edge detection technique uses a 3×3 pixel kernel to determine the edge magnitude for each pixel based on the intensity value of the pixel in relation to the intensity values of the eight adjacent pixels. The result is an edge magnitude map that includes edge magnitude values for the digital image.

Figure 6:
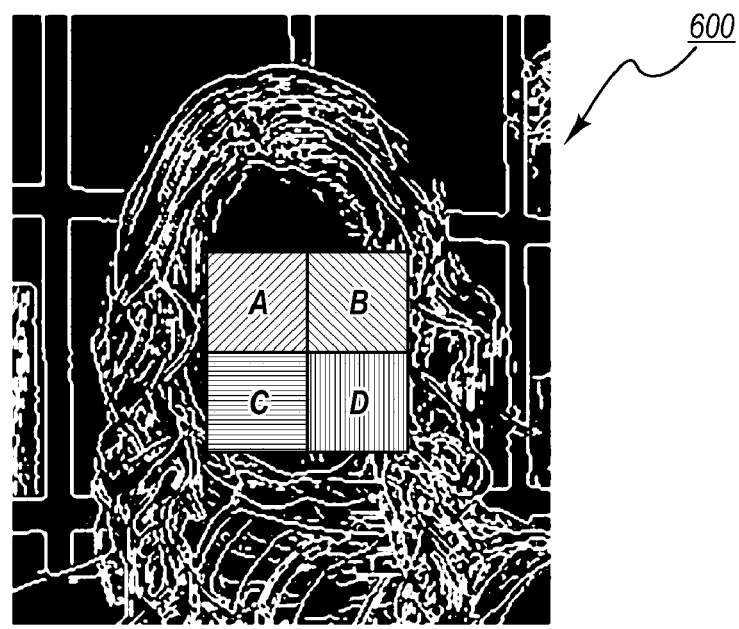
FIG. 6 illustrates four basic feature units applied on an edge map of the image of FIG. 5.

FIG. 6 illustrates an exemplary binary edge map 600 for a sub-window of a digital image divided into four rectangular frames: A, B, C, and D. The binary edge map may be obtained by determining, $$e(I) = \begin{cases} 1, & \text{if } s(I) \geq \theta_e \\ 0, & \text{otherwise} \end{cases},$$

where s(I) is the edge magnitude and $\theta_e$ is an adjustable threshold. Given the edge map e(x) of a sub-window x(x,y,s), the seven scalar features $f_1$ to $f_7$ may be extracted in a similar manner as was described above. These scalar features may then compared to a threshold set for each of the seven scalar features, such as was described by $f_i(x)$ above. If any one of the scalar features for a sub-window fails to meet the respective threshold, the edge based classifier 206 deems the sub-window is deemed non-face by the edge based classifier 206, and the determination of the remainder of the seven scalar features and the classifiers may be aborted.

As described previously, the example boost based processor 208 includes a plurality of cascaded modules 402a-n, where a first group of modules are used during the first scan, and a second group of the cascaded modules are used during the second scan. A description of example embodiments for implementing the boost based processor 208 will now be provided.

Figure 7:
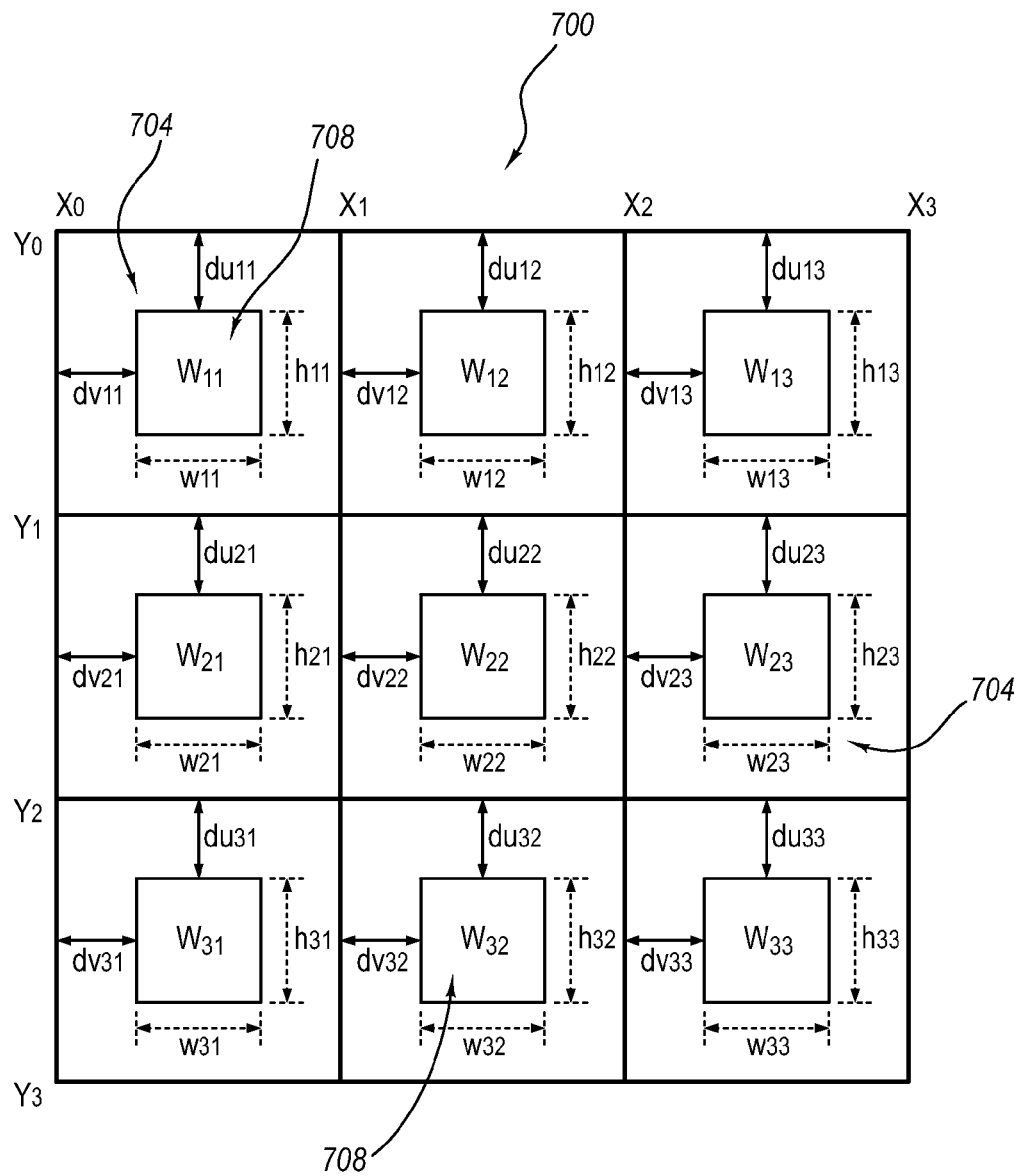
FIG. 7 illustrates a geometrical prototype template of a 3×3 rectangular feature.

FIG. 7 illustrates a geometrical prototype 700 template in a sub-window x=Rectangle($X_0X_3Y_0Y_3$). The prototype template 700 is divided into nine rectangles $\{W_{ij}\}_{i,j=1}^3$ (704) in a three-by-three array, and within each frame is located a sample region 708. The prototype template 700 is shown spanning the horizontal range from $X_0$ to $X_3$, and the vertical range from $Y_0$ to $Y_3$. The locations and dimensions of the nine rectangular sample regions 704 are controlled by the following set of variables:

$\{X_k\}_{k=0}^3$, the x-coordinate of each dividing line between frames, $\{Y_k\}_{k=0}^3$, the y-coordinate of each dividing line between frames, $\{du_{ij}\}_{i,j=1}^3$, the vertical offset of the sample region from the top of each frame, $\{dv_{ij}\}_{i,j=1}^3$, the horizontal offset of the sample region from the top of each frame, $\{w_{ij}\}_{i,j=1}^3$, the width of each sample region, and $\{h_{ij}\}_{i,j=1}^3$, the height of each sample region.

The heights and widths of each frame may generally be equal, as are the heights and widths of each sample region within each frame.

A scalar weighting, $B_{ij} \in R$, may be associated with each sample region $\{W_{ij}\}_{i,j=1}^3$. A scalar feature of the sub-window may then be computed by a linearly weighted combination of the sums of values of the pixels of the nine sample regions; that is $$f_n(\vartheta) = \sum_{i=1}^3 \sum_{j=1}^3 B_{ij} \cdot \text{sum}(W_{ij}),$$

where:

$$\vartheta = \left\{ \{X_k\}_{k=0}^3, \{Y_k\}_{k=0}^3, \{du_{ij}\}_{i,j=1}^3, \{dv_{ij}\}_{i,j=1}^3, \{w_{ij}\}_{i,j=1}^3, \{h_{ij}\}_{i,j=1}^3, \{B_{ij}\}_{i,j=1}^3 \right\}$$

is the set of all the variables, and sum($W_{ij}$) denotes the sum across all pixels of the sample region $W_{ij}$. The function sum ($W_{ij}$) may be computed efficiently from a summed-area table, such as described in "Summed-area tables for texture mapping", F. Crow, SIGGGRAPH, 1984, vol. 18(3), pp. 207-212, the contents of which are incorporated by reference herein. Alternatively, the function sum($W_{ij}$) can be computed efficiently from an integral image, such as described in "Robust real-time face detection", Paul Viola and Michael J. Jones, *International Journal of Computer Vision*, vol. 57, May 2004, pp. 137-154, the contents of which are incorporated by reference herein. By varying the values of $\vartheta$, various scalar features can be generalized from a two-dimensional signal. Other techniques for computing sum($W_{ij}$) may also be used, as will be appreciated by one of ordinary skill in the art. For a sub-window of size 20×20 pixels, there are tens of thousands of such features. These features form an over-complete feature set for the sub-window.

Because the computation of the feature set can result in a larger feature set than is necessary, in one embodiment, an AdaBoost-like technique may be employed to select the most significant features that will be used during face detection. In general, given a set of training samples, the AdaBoost-like technique may determine weak classifiers, and then linearly combine the weak classifiers to form strong classifiers. The strong classifiers may then be cascaded to form the cascaded modules 402a-n, as illustrated in FIG. 4.

A set of N labeled training examples is given as $(x_1; y_1), \ldots, (x_N; y_N)$, where $y_i \in \{+1, -1\}$ is the class label for the example $x_i \in R^n$. AdaBoost may utilize an available procedure for learning a sequence of weak classifiers $h_m(x)$ (m=1, 2, ..., M) from the training examples, with respect to the distributions $w_j^{(m)}$ of the examples. In one embodiment, each weak classifier $h_m(x)$ may be associated with a single scalar feature $f_i$. A stronger classifier $H_M(x)$ may be calculated by a linear combination of the M weak classifiers, that is:

$$H_M(x) = \sum_{m=1}^{M} h_m(x) - \theta_b$$

where $\theta_b$ is the threshold for controlling the tradeoff of detect rate and false positive. The classification of x may be obtained as $\hat{y}(x) = \text{sign}[H_M(x)]$ and the normalized confidence score may be obtained as $|H_M(x)|$. The form of $h_m(x)$ may include a discrete function, or alternatively, many AdaBoost variants may be employed that use real $h_m(x)$ have.

In one embodiment, a technique referred to as a "gentle AdaBoost" may be employed for minimizing the following weighted least square error, $$E(f_i) = \sum_{j=1}^{N} w_j (h_m(f_i, x_j) - y_j)^2$$

where $$h_m(f_i, x_j) = \begin{cases} v_i, & \text{if } f_i \geq \theta_i \\ \mu_i, & \text{otherwise} \end{cases}, \text{ with } v_i, \mu_i \in [-1, 1]$$

$$v_i = \frac{W_+^r - W_-^r}{W_+^r + W_-^r},$$

$$\mu_i = \frac{W_+^l - W_-^l}{W_+^l + W_-^l},$$

$$W_+^r = \sum_{j:(y_j=1) \& (f_i(x_j) \geq \theta_i)} w_j,$$

$$W_-^r = \sum_{j:(y_j=-1) \& (f_i(x_j) \geq \theta_i)} w_j,$$

$$W_+^l = \sum_{j:(y_j=1) \& (f_i(x_j) < \theta_i)} w_j,$$

$$W_-^l = \sum_{j:(y_j=-1) \& (f_i(x_j) < \theta_i)} w_j,$$

In one embodiment, the optimal parameters of $h_m$ together with the best feature $f_*$ can be determined by minimizing the error of the weighted least square error, $E(f_i)$, that is:

$$f_* = \underset{f_i}{\arg\min} E(f_i)$$

In this manner, AdaBoost learning may be used to select the most significant features from the proposed over-complete feature set.

A boosted strong classifier effectively eliminates a large portion of non-face sub-windows while maintaining a high detection rate for sub-windows that represent face. A number of the strong classifiers, $H_M(x)$, are trained and organized in a cascaded manner, as was described previously in FIG. 4. As described above, in the present invention, a first portion of the strong classifiers (i.e., cascaded modules 402) may be used during a first scan of an image, while the remaining and more accurate strong classifiers may be used during a second scan of the image. Therefore, sub-windows which fail to pass the first scan will not be further processed by the subsequent strong classifiers included during the second scan. The sub-window x is finally considered to represent a face when it passes both the first and the second scan. This strategy can significant speed up the detection process and reduce false positives.

Figure 8:
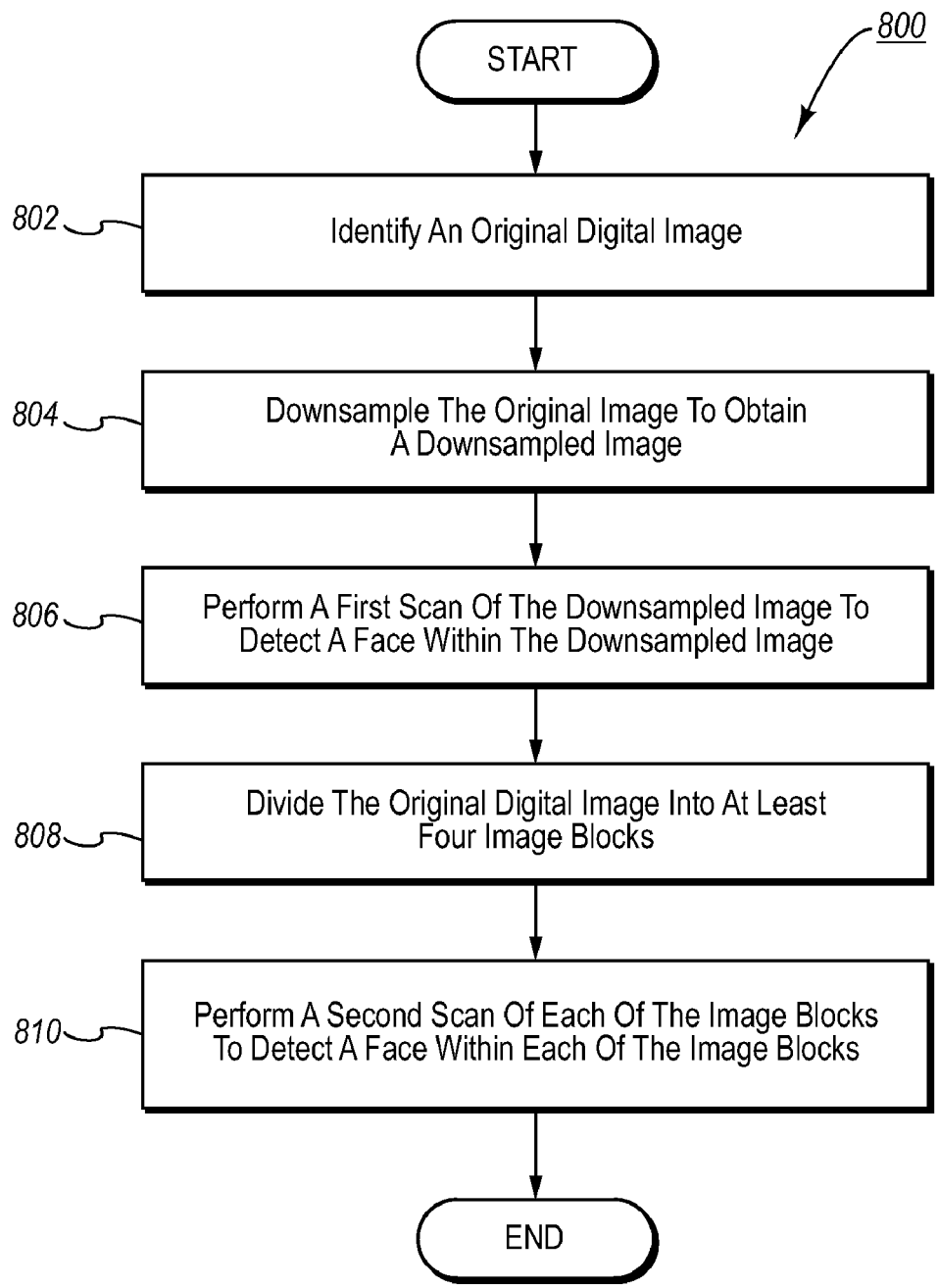
FIG. 8 illustrates a flow diagram describing one example of a method of scanning a digital image for detecting the representation of an object.

FIG. 8 illustrates one embodiment of an aspect of a method 800 that can be used for scanning a digital image for detecting the representation of an object such as a face, and for reducing the memory and processing requirements of a computer system. The method 800 may be practiced, for example, in a computer system that includes one or more computer-readable media having computer-executable instructions, that when executed, implement the method 800.

The method 800, beginning at step 802, identifies an original digital image, such as the image 300 illustrated in FIG. 3A. The method 800 then downsamples the original image, at program step 804, in an x-dimension and in a y-dimension to obtain a downsampled image, such as the example downsample image 320 illustrated in FIG. 3B. The downsampled image 320 requires less storage space than the original digital image 300. The method 800, at program step 806, performs a first scan of the downsampled image 320 to detect the representation of an object, such as a face, within the downsampled image.

At step 808, the original digital image 300 is divided into at least four image blocks. As depicted in the FIG. 3C example, each image block 342, 344, 346 and 348 contains a portion of the original digital image 300. In one embodiment, as illustrated in the FIG. 3D example, each image block 362, 364, 366 and 368 contains an overlapping portion of at least one of the other image blocks.

As denoted at step 810, the method 800 performs a second scan of each of the image blocks to detect the representation of the object, such as a face, within each of the image blocks. By performing the two scanning levels described in the method 800, the memory required to detect faces within the original image 300 can be reduced, while maintaining a high face detection level and without sacrificing a great deal of speed.

In one embodiment of the method 800, the minimum sized face scanned for by the first scan (step 806) is larger than the minimum sized face scanned for during the second scan. By only searching for larger faces during the first scan, the method 800 is able to preserve resources by only scanning for small faces during the second scan (step 810). Furthermore, larger faces that occupy more than one image block can still be detected during the first scan. Furthermore, in order to improve the face detection rate for faces of all sizes, the range of scale sizes searched for during the first scan may overlap with the range of scale sizes used during the second scan.

To further improve the efficiency of the method 800, the second scan (program step 810) may bypass regions within each of the image blocks that map to regions in the downsampled image that contain faces that were detected during the first scan (step 806). Therefore, regions that are already known to contain a face are only scanned a single time.

Embodiments herein may comprise a special purpose or general-purpose computer including various computer hardware implementations. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for scanning a digital image for detecting the representation of an object, the method comprising:
   identifying an original digital image;
   downsampling the original image in a first dimension and in a second dimension to obtain a downsampled image;
   performing a first scan of the downsampled image to detect the representation of an object within the downsampled image;
   dividing the original digital image into at least two image blocks, each image block containing a portion of the original digital image and further each image block containing an overlapping portion of at least one of the other image blocks; and
   performing a second scan of each of the at least two image blocks to detect the representation of the object within each of the at least two image blocks; and
   determining starting points for the second scan of each of the at least two image blocks such that only a single scan of the overlapping portion is performed.

2. The method as recited in claim 1, wherein the first scan and the second scan further comprise scanning a plurality of sub-windows to detect the representation of the object in each of the sub-windows, a size of each of the sub-windows defined by a scale size.

3. The method as recited in claim 2, wherein a range of scale sizes used during the first scan overlaps with a range of scale sizes used during the second scan.

4. The method as recited in claim 2, wherein a minimum scale size used during the first scan is larger, in relation to the original image, than a minimum scale size used during the second scan, such that the first scan is configured to detect objects that are larger, in relation to the original image, than the objects that the second scan is configured to detect.

5. The method as recited in claim 2, wherein performing the first scan and performing the second scan further comprise:
   generating a color component for each of the sub-windows;
   generating an edge component for each of the sub-windows; and
   generating a boosting-based component for each of the sub-windows;
   wherein the sub-windows do not represent the object when any of the color component, the edge component, or the boosting-based component fall below predetermined levels.

6. The method as recited in claim 1, wherein performing a second scan of each of the at least two image blocks further comprises bypassing regions within each of the at least two image blocks that map to regions of the downsampled image wherein the representation of the object was detected during the first scan.

7. A face detection system, comprising:
   a downsampling module configured to downsample an original digital image by at least a factor of two in an x-dimension and by at least a factor of two in a y-dimension to obtain a downsampled image;
   an image dividing module configured to divide the original digital image into at least four image blocks, each image block containing a portion of the original digital image, wherein the image dividing module is further configured to divide the original digital image such that each of the at least four image blocks contain an overlapping portion of at least one of the other image blocks;
   an image scanning module configured to perform a first scan of the downsampled image to detect the representation of a face in the downsampled image and further configured to perform a second scan of each of the at least four divided image blocks to detect the representation of the face in the at least four divided image blocks, wherein the image scanning module is further configured to determine starting points for the second scan of each of the at least four image blocks such that only a single scan of the overlapping portion is performed; and
   a non-transitory memory configured to store the original digital image, the downsampled image, the at least four image blocks, and data produced during the first scan and the second scan.

8. The face detection system as recited in claim 7, wherein the image scanning module is further configured to scan the downsampled image and the at least four divided image blocks as a plurality of sub-windows, a size of each of the sub-windows defined by a scale size.

9. The face detection system as recited in claim 8, further comprising a scale size selection module configured to select a minimum scale size used during the first scan that is larger, in relation to the original image, than a minimum scale size used during the second scan, such that the first scan is configured to detect objects that are larger, in relation to the original image, than the objects that the second scan is configured to detect.

10. The face detection system as recited in claim 8, wherein the image scanning module further comprises:
- a skin color based classifier configured eliminate the sub-windows that have a low likelihood of representing a face based on the colors of the sub-windows;
- an edge based classifier coupled to the skin color based classifier and configured to eliminate additional sub-windows that have a low likelihood of representing a face based on an edge magnitude of the digital image within the sub-windows; and
- a boost classifier coupled to the edge based classifier having a plurality of cascaded modules configured to analyze the digital image to eliminate additional sub-windows that have a low likelihood of representing a face.

11. The face detection system as recited in claim 10, wherein the skin color based classifier is further configured to generate a skin color component for each of the sub-windows, the edge based classifier is further configured to generate an edge component for each of the sub-windows, and the boost classifier is further configured to generate a simplified boosting-based component for each of the sub-windows, and wherein the sub-windows are eliminated when any of the skin color component, the edge component, or the simplified boosting-based component fall below predetermined levels.

12. The face detection system as recited in claim 7, further comprising a post processor configured to process results of the image scanning module and to generate an output for identifying faces detected within the original digital image.

13. The face detection system as recited in claim 7, wherein the image scanning module is further configured to bypass regions within each of the at least four image blocks during the second scan that map to regions of the downsampled image wherein the representation of the object was detected during the first scan.

14. A non-transitory computer readable medium having stored thereon computer executable instructions that, when executed by a processor, cause the processor to perform the following:
- identify an original digital image;
- downsample the original image by at least a factor of two in a first dimension and by at least a factor of two in a second dimension to obtain a downsampled image;
- perform a first scan of the downsampled image to detect the representation of a face within the downsampled image;
- divide the original digital image into at least four image blocks, each image block containing a portion of the original digital image and further, each image block containing an overlapping portion of at least one of the other image blocks; and
- perform a second scan of each of the at least four image blocks to detect the representation of the face within each of the at least four image blocks; and
- determine starting points for the second scan of each of the at least four image blocks such that only a single scan of the overlapping portion is performed.

15. The non-transitory computer readable medium as recited in claim 14, wherein a minimum size of faces scanned for during the first scan is larger, in relation to the original digital image, than a minimum size of faces scanned for during the second scan.

16. The non-transitory computer readable medium as recited in claim 14, wherein the computer executable instructions that perform the second scan of each of the at least four image blocks further comprise instructions, that when executed, bypass regions within each of the at least four image blocks that map to regions of the downsampled image wherein the representation of the face was detected during the first scan.

* * * * *